United States Patent Office 3,540,820
Patented Nov. 17, 1970

3,540,820
PHOTOFLASH LAMP
John W. Shaffer, Williamsport, Pa., assignor to Sylvania Electric Products Inc., a corporation of Delaware
Continuation-in-part of application Ser. No. 691,558, Dec. 18, 1967. This application May 23, 1969, Ser. No. 827,298
Int. Cl. F21k 5/02
U.S. Cl. 431—93                3 Claims

ABSTRACT OF THE DISCLOSURE

A percussive-type photoflash lamp in which the primer thereof includes a charge of fulminating material having a chemical dispersing agent as one of its components in order to facilitate handling in production and to enhance performance in operation.

---

Figure 1:
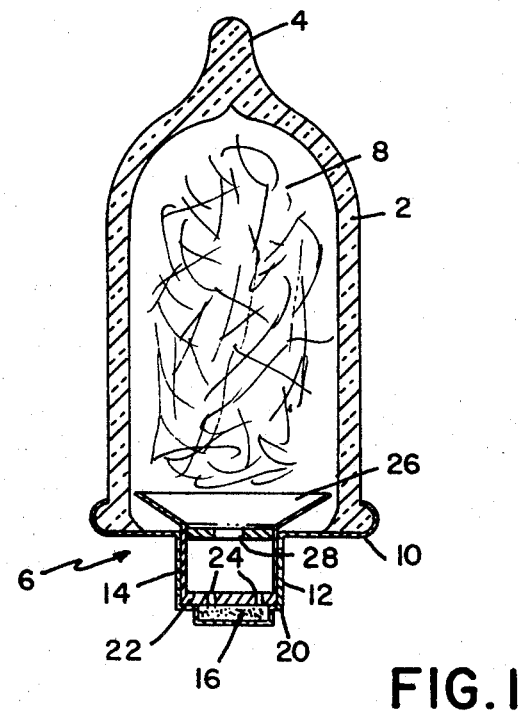

This application is a continuation-in-part of my co-pending application Ser. No. 691,558, filed Dec. 18, 1967 now abandoned.

This invention relates to the manufacture of photoflash lamps and more particularly those of the percussive-type.

Generally speaking, a percussive-type photoflash lamp comprises an hermetically sealed, light-transmitting envelope containing a source of actinic light and having a primer secured thereto. In one form, the percussive-type photoflash lamp comprises a length of glass tubing constricted to a tip at one end thereof and having the shell portion of a primer secured to the other end thereof. The length of glass tubing which defines the lamp envelope contains a combustible such as shredded zirconium foil and a combustion-supporting gas such as oxygen. The primer comprises a metal shell within which an anvil and a charge of fulminating material are disposed.

Operation of this form of lamp is initiated by a firing pin which is caused to strike the bottom of the primer cup or shell to promote ignition of the charge of fulminating material disposed therein. Deflagration of the charge ignites the shredded foil, the combustion of which is the source of the actinic light.

Fulminating material for the primer of this form of percussive-type photo-flash lamp usually comprises a mixture of red phosphorus, potassium chlorate, zirconium powder and an abrasive. Preferably, the red phosphorus is a special, stabilized grade, the particles of which are coated with aluminum hydroxide to inhibit their slow room temperature oxidation. The very fine particles are removed from stabilized red phosphorus because their large surface to volume ratio favors this degradative oxidation. Any excessive milling or grinding of this material during the manufacture of fulminating material for primers for this form of percussive-type flash-lamp tends to destroy the stabilization effectiveness by removing the protective coating and by reducing the average particle size. Such loss of phosphorus stabilization shows up in decreased ignition sensitivity of the charge during storage of the flashlamps and thus results in a high incidence of lamp ignition failures. It is therefore desirable to use only relatively mild stirring to effect mixture of the fulminating material ingredients.

During the manufacture of percussive-type flashlamps of this form, the charge of fulminating material is most conveniently applied by means of a syringe. However, serious problem of syringe clogging have been encountered due to the formation of hard lumps of agglomerates of particles of phosphorus, zirconium and abrasive that are much larger than their constituent particles.

In view of the foregoing, one of the principal objects of this invention is to promote efficient mixing of the fulminating material without degradative mechanical milling and at the same time prevent formation of hard agglomerates.

In another form, the percussive-type photoflash lamp may comprise a length of glass tubing constricted to a tip at one end thereof and shaped to define a seal at the other end thereof. The length of glass tubing which defines the lamp envelope contains a combustible such as shredded zirconium foil and a combustion-supporting gas such as oxygen. The primer may comprise a metal tube sealed intermediate its ends in the seal and a charge of fulminating material on a wire supported in said tube. Operation of this form of lamp is initiated by an impact onto the tube to cause deflagration of the fulminating material up through the tube to ignite the combustible disposed in the lamp envelope.

Fulminating material for the primer of this form of percussive-type photoflash lamp, for safety reasons, is preferably prepared as a two-part system with the fuels and the oxidizer made up in the form of separate components with Part A containing zirconium, boron, red phosphorus and aqueous binder solution and Part B containing potassium chlorate and binder solution. These slurries are milled separately to give homogeneous suspension of extremely fine particles. Small quantities of Parts A and B are then mixed together to form the final primer fulminating material, as needed.

During the manufacture of percussive-type flashlamps using this fulminating material composition, it was found that crystal growth in the Part B chlorate slurry limits the useful shelf life of this material to about one week or less.

In view of the foregoing, another of the principal objects of this invention is to retard significantly or prevent crystal growth.

These and other objects, advantages and features are attained, in accordance with the principles of this invention, by the addition of a chemical dispersing agent, more specifically a small quantity of lignin sulfonate, to the fulminating material components. Quite surprisingly, this new composition shows enhanced ignition sensitivity toward impact in addition to attaining the foregoing objectives. Although the exact mechanism for this enhanced sensitivity is not fully understood, the presence of a more homogeneous dispersion is obvious.

Figure 2:
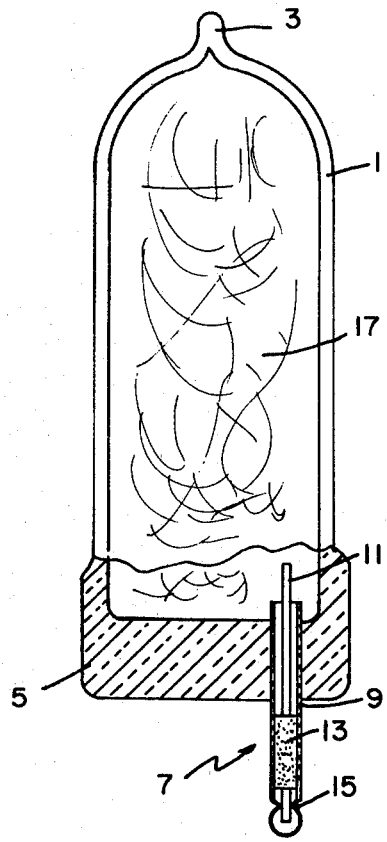

In the accompanying drawings, FIG. 1 is an elevational view in section of one form of percussive-type photoflash lamp with which the composition of fulminating material of this invention may be employed an FIG. 2 is an elevational view partly in section of another form of percussive-type photoflash lamp with which said composition may be employed.

The flashlamp of FIG. 1 comprises a lamp envelope 2 having an exhaust tip 4 defining one end thereof and having a primer 6 sealed to the other end thereof. A combustible such as filamentary zirconium 8 and a combustion-supporting gas such as oxygen are disposed within the lamp envelope 2. The primer 6 comprises a metal shell or base 10 having a central depending cup portion 12 within which anvil 14 and a charge 16 of fulminating material are disposed. The bottom of the cup 12 is coined to define an accurately dimensioned reservoir within which the charge of fulminating material is disposed and to provide an internal rim 20 on which the anvil 14 is seated. The anvil 14 is a cup-shaped insert having a flat bottom 22 with holes 24 therein, an upper flange 26 and a baffle 28.

A specific example of a fulminating material which has been found to be very satisfactory has the following dried composition: 34.57% zirconium, 12.62% potassium chlorate, 12.62% stabilized red phosphorus, 0.12% magnesium oxide, 38.88% aluminum oxide abrasive, 0.18% thixotropic clay, 0.3% hydroxyethyl cellulose and 0.72% lignin sulfonate. Sufficient water is added to give the desired viscosity.

Although lignin sulfonate is preferable as the dispersing agent because it is compatible with the thixotropic clay used and with the high salt concentration of the fluid primer mixture, other dispersing agents having similar properties may also be used. The weight of the dispersing agent may be varied from about 0.1% to about 5.0%. When less than about 0.1% is used it is insufficient to be effective and when more than about 5.0% is used it causes excessive dilution of the composition. The relative percentages of the other ingredients may be adjusted to provide the type of burning characteristics that are desired. For example, if the more important characteristic in a given application is high sensitivity to impact, then the combined percentage of the red phosphorus and potassium chlorate should be relatively high. On the other hand, if a less volatile combustion is preferable, then the combined percentage of the red phosphorus and potassium chlorate should be lowered.

The flashlamp of FIG. 2 comprises a length of glass tubing defining a hermetically sealed lamp envelope 1 constricted at one end to define an exhaust tip 3 and shaped to define a seal 5 at the other end thereof. A primer 7 is sealed intermediate its ends in the seal 5. The primer 7 comprises a metal tube 9, a wire 11 and a charge of fulminating material 13. The end of the tube 9 located outside the lamp envelope 1 is closed whereas the other end, which is located inside the lamp envelope, is open. The wire 11 is supported within the tube 9 by a crimp 15 near the outside end thereof. The charge of fulminating material 13 is located on that segment of the wire 11 which is located in the exposed segment of the tube 9. A combustible such as filamentary zirconium 17 and a combustion-supporting gas such as oxygen are disposed within the lamp envelope 1. Operation of the lamp is initiated by an impact onto the tube 9 to cause deflagration of the fulminating material 13 up through the tube to ignite the combustible 17 disposed within the lamp envelope.

By way of example, a two part system may having the following composition with the percentages being by weight of the wet paste.

| Part A: | Percent |
|---|---|
| Red phosphorus | 18.12 |
| Boron | 13.54 |
| Magnesium oxide | .31 |

| Part A: | Percent |
|---|---|
| Sulfur | .02 |
| Zirconium | 14.93 |
| Hydroxyethylcellulose | .83 |
| Orthophenylphenol | .01 |
| Sodium tetradecylsulfate | .04 |
| Water | 52.20 |

| Part B: | |
|---|---|
| Potassium chlorate | 43.91 |
| Magnesium oxide | .42 |
| Lignin sulfonate | .21 |
| Hydroxyethylcellulose | .33 |
| Orthophenylphenol | Trace |
| Water | 55.13 |

As noted above, these slurries are milled separately to give homogeneous suspensions of extremely fine particles and then about 1 part by wet weight of Part A and about .42 part by wet weight of Part B are mixed together to provide a supply of the final composition as needed.

What is claimed is:

1. A photoflash lamp comprising: an hermetically sealed, light-transmitting envelope; a quantity of filamentary combustible material located within said envelope; a combustion-supporting gas in said envelope; and a primer secured to one end of said envelope and in communication therewith, said primer including a charge of percussion-sensitive fulminating material having a chemical dispersing agent as one of its components whereby a more homogeneous dispersion thereof is obtained.

2. The combination of claim 1 in which said dispersing agent is lignin sulfonate.

3. The combination of claim 1 in which said dispersing agent is between about 0.1% to about 5.0% by weight of the dried ingredients of said fulminating material.

References Cited

UNITED STATES PATENTS

| 2,024,225 | 12/1935 | Igari | 431—93 |
| 2,662,818 | 12/1953 | Schuricht | 102—86.5 X |
| 2,305,561 | 12/1942 | Sylvester | 431—95 |

EDWARD J. MICHAEL, Primary Examiner

U.S. Cl. X.R.

149—22, 30